(12) United States Patent
Dobbs et al.

(10) Patent No.: US 9,398,747 B2
(45) Date of Patent: Jul. 26, 2016

(54) BRUSH CLEARING MACHINE

(71) Applicants: John McGregor Dobbs, Cambridge, MA (US); Jon Rosenfeld, Cambridge, MA (US)

(72) Inventors: John McGregor Dobbs, Cambridge, MA (US); Jon Rosenfeld, Cambridge, MA (US)

( * ) Notice: Subject to any disclaimer, the term of this patent is extended or adjusted under 35 U.S.C. 154(b) by 686 days.

(21) Appl. No.: 13/925,554

(22) Filed: Jun. 24, 2013

(65) Prior Publication Data

US 2014/0374233 A1 Dec. 25, 2014

(51) Int. Cl.
*A01G 23/06* (2006.01)
*C10B 53/02* (2006.01)
*C10B 19/00* (2006.01)

(52) U.S. Cl.
CPC .............. *A01G 23/067* (2013.01); *A01G 23/06* (2013.01); *C10B 19/00* (2013.01); *C10B 53/02* (2013.01); *Y02E 50/14* (2013.01)

(58) Field of Classification Search
CPC ....... A01B 13/00; A01G 23/02; A01G 23/06; A01G 23/062; A01G 23/065; A01G 23/067; A01G 23/093; A01G 23/043; E02F 5/32; B27L 11/00; B27L 11/002; B27L 11/005; B27L 11/02; B27L 11/04
See application file for complete search history.

(56) References Cited

U.S. PATENT DOCUMENTS

| | | | | |
|---|---|---|---|---|
| 3,589,313 | A * | 6/1971 | Smith | B03B 9/06 110/222 |
| 6,045,070 | A * | 4/2000 | Davenport | B02C 7/04 175/206 |
| 6,182,584 | B1 * | 2/2001 | Gaudio | C10B 51/00 110/101 C |
| 8,236,535 | B2 * | 8/2012 | Medoff | C07H 3/02 435/161 |
| 2004/0060236 | A1 * | 4/2004 | Yoshikawa | B01J 6/008 48/63 |

* cited by examiner

*Primary Examiner* — Matthew G Katcoff
(74) *Attorney, Agent, or Firm* — Dunlap Bennett & Ludwig PLLC

(57) ABSTRACT

A machine for clearing and converting woody biomass into a bio fuel is described. The machine may be mobile and may include a chipper. The machine may further include a vacuum intake that directs chipped woody biomass to a wood processing component within the machine. The wood processing component may convert the woody biomass into bio char, bio oil, and bio gas using a pyrolyzer system.

17 Claims, 3 Drawing Sheets

BRUSH CLEARING MACHINE

BACKGROUND OF THE INVENTION

The present invention relates to the increased number and magnitude of forest fires and, more particularly, to a machine that clears brush and converts the brush into bio fuels.

Large forest fires are a rapidly increasing problem in the Western United States and Canada, and millions of dollars are being spent to control them. The effort is limited by available funds. However when fires break out, billions of dollars are spent on an emergency basis, extinguishing them and repairing the damage.

Treating forests to reduce the strength and number of fires is an ongoing activity, however, according to the USDA Forest Service, "Treatment costs are increased by a need to treat large numbers of low-volume stems less than 4 inches in diameter. Gross costs can range from $35 to over $1000 per acre depending on type of operation, terrain, and the number of trees treated . . . . While 86% of the trees that would be cut are less than 10 inches, most of the volume that would be treated comes from the 14% of the trees that are larger than 10 inches in diameter. This is the central dilemma of fuel reduction treatments—large numbers of small diameter trees with relatively little volume that can be feasibly utilized must be treated." The presently available equipment used to carry out this work was designed for conventional timber harvesting and is not appropriate for the problem of ladder fuel reduction.

As can be seen, there is a need for a harvesting machine that reduces ladder fuel.

SUMMARY OF THE INVENTION

In one aspect of the present invention, a brush clearing and conversion machine comprises: a body having a front end and a rear end; at least one front wheel mounted to the machine near the front end and at least one rear wheel mounted to the machine near the rear end; a wood chipper connected to the machine; a wood processing component comprising an intake chute, a blower operatively connected to the intake chute, creating a vacuum, and a pyrolyzer system, wherein the intake chute feeds into the pyrolyzer system; and at least one motor having a power source, wherein the at least one motor is operatively connected to the chipper, the wood processing component, and at least one of the front wheel and rear wheel, wherein the pyrolyzer system is capable of converting wood chips into bio fuel.

These and other features, aspects and advantages of the present invention will become better understood with reference to the following drawings, description and claims.

BRIEF DESCRIPTION OF THE DRAWINGS

FIG. 4 is a schematic view of the pipelined batch drying pyrolyzer.

DETAILED DESCRIPTION OF THE INVENTION

Figure 1:
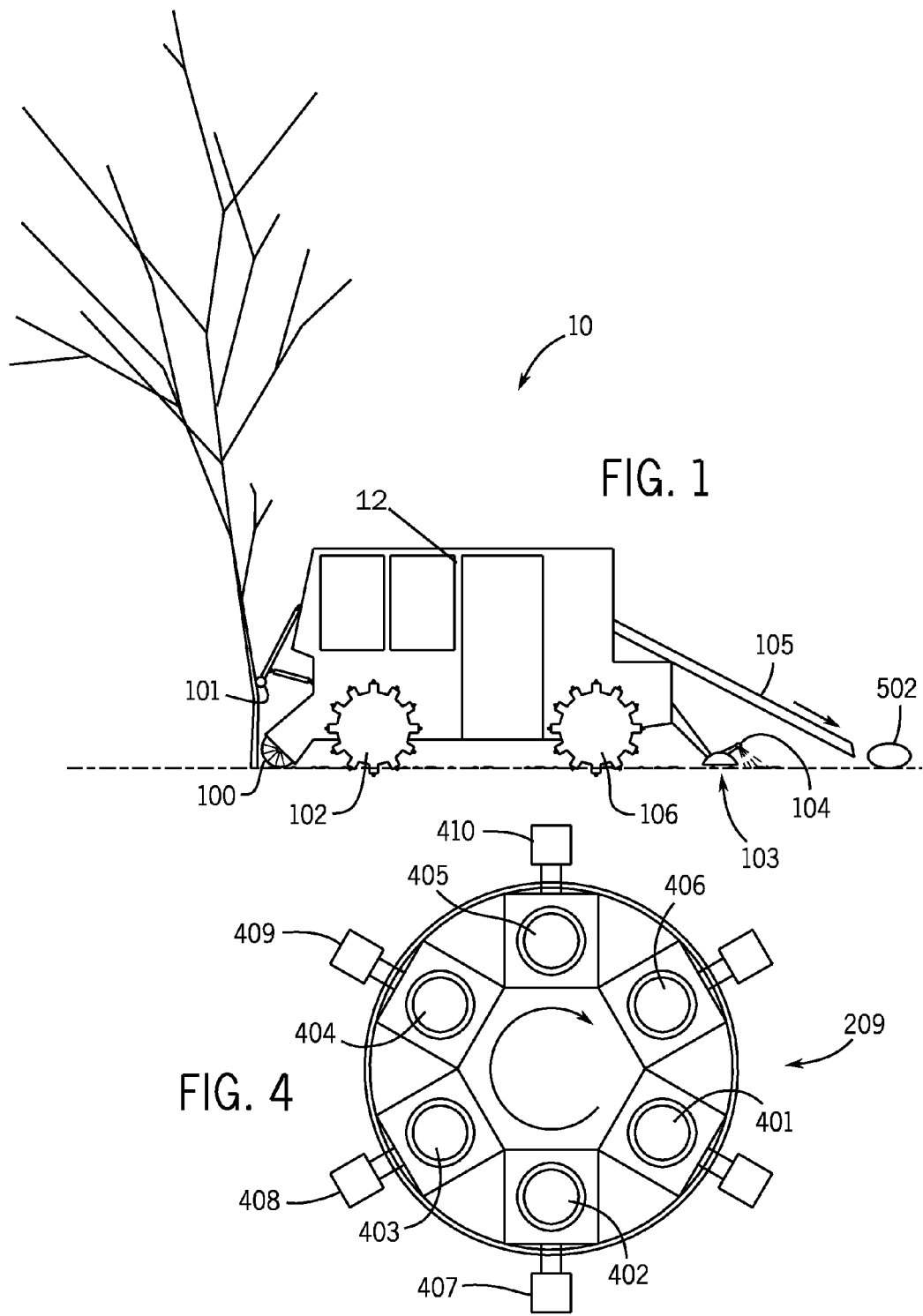
FIG. 1 is side elevation view of the present invention in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a machine for clearing and converting woody biomass into a bio fuel. The machine may be mobile and may include a chipper. The machine may further include a vacuum intake that directs chipped woody biomass to a wood processing component within the machine. The wood processing component may convert the woody biomass into bio char, bio oil, and bio gas using a pyrolyzer system.

The present invention may include a machine for clearing small trees and other woody biomass, which are the prime fuel for forest fires, but are too small to harvest profitably. The highly heterogeneous and low energy density forest material may be chipped, dried, and converted into carbon, bio oil, and biogas which are uniform, higher in energy density and easy and safe to handle. In certain embodiments, the machine may derive its fuel from the biomass it harvests. Further, the present invention may have a low impact on the forest floor and may adapt to highly variable nature of the forest environment.

In certain embodiments, the present invention may dry the wood using waste heat from the machine's internal combustion engine. The wood may then be processed using microwave energy in a pipelined batch pyrolyzer which may have the flexibility to achieve high throughput and high product quality while the input feedstock varies over a wide range of characteristics. In certain embodiments, a computer may process the data from multiple sensors and operator inputs to adjust all the operating parameters of the machine and carry out highly complex timing and control of the pyrolyzer.

Referring to FIGS. 1 through 5, the present invention may include a machine 10 for clearing brush and small trees that are susceptible to forest fire. The machine 10 may include a body 12 that includes a front end and a rear end. The machine 10 may include at least one front wheel 102 near the front end and at least one rear wheel 106 near the rear end. In certain embodiments, the front wheel 102 and the rear wheel 106 may include spikes that may be long enough to support the machine 10 on isolated footprints, which may be sufficiently local so that they may be filled in by surrounding vegetation a few days after the machine 10 has passed. The spikes may further provide traction to go up steep slopes. In alternative embodiments, the front wheel 102 and the rear wheel 106 may be encompassed in a track system. Further, in certain embodiments the present invention may include four or more wheels 102, 106 and the wheels 102, 106 may include tires with tread.

In certain embodiments, an active bar 101 may be protruding from the front end of the machine 10. The active bar 101 may be used to push larger trees away from the machine as they are being cut by a chipper 100, as illustrated in FIG. 1. The chipper 100 may be located at the front end of the machine 10. In certain embodiments, the chipper 100 may be located at the lower front end of the machine 10 to chip away at bushes, small trees, and the like on the forest ground. The chipper 100 and the active bar 101 may be hydraulically or electrically driven.

The machine 10 of the present invention may consume small vegetation, simulating an understory forest fire. In certain embodiments, the present invention may further include a housing 103 protruding from the rear of the machine 10 that may contain a burner for controlled burning to singe the ground. In such embodiments, to prevent fire from spreading, water nozzles 104 may spray water onto the scorched forest floor. The machine 10 may be operated by a single user, however for the controlled burning and the water nozzles 104, a second man may be desired. In certain embodiments, to provide uniformity and safety, the scorcher may be computer controlled to vary the flame with the speed of the machine 10 and the flame may be automatically extinguished once the machine 10 has stopped.

Figure 2:
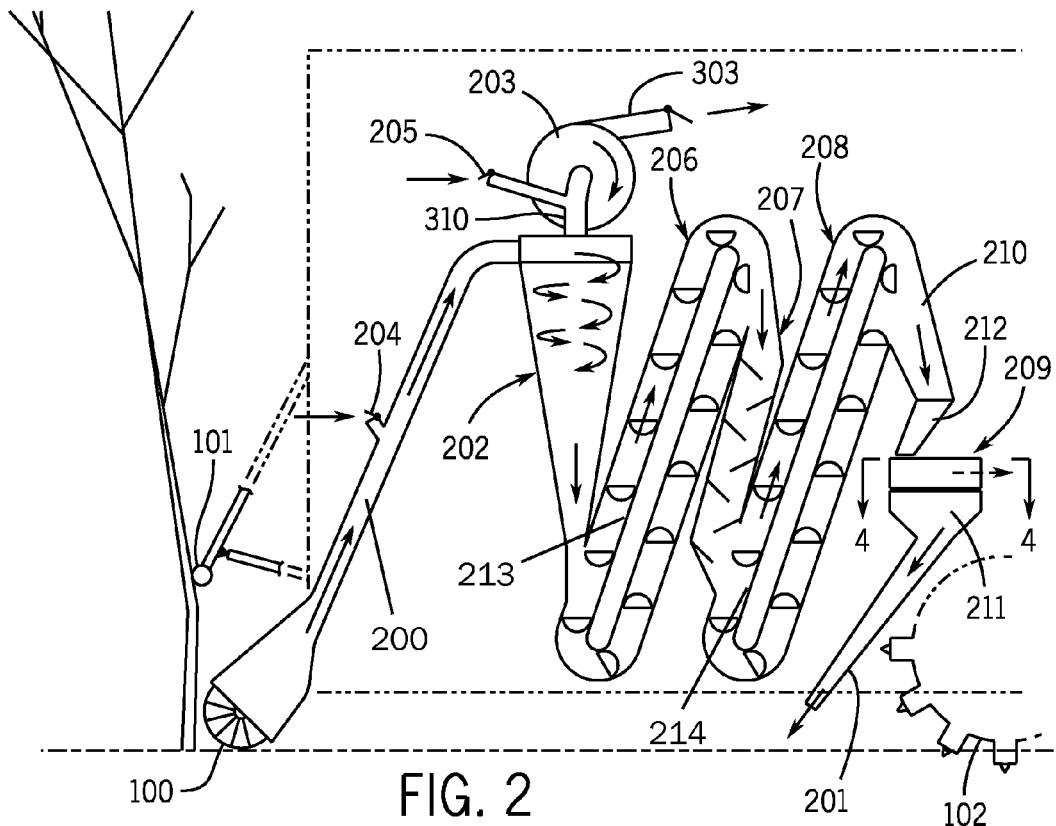
FIG. 2 is a schematic side elevation view of the machine's wood processing components.

In certain embodiments, the present invention may further include a wood processing component, as illustrated in FIG. 2. The wood processing component may include an intake chute 200. In certain embodiments, the intake chute 200 may be connected to the chipper 100. The chipper 100 may shred the small vegetation and a blower 203 may vacuum the shredded vegetation into the intake chute 200 and into a cyclone separator 202 that may be connected to the intake chute 200. In certain embodiments, wood chips may be pulled up from the ground by the blower 203. However, not all chips may be removed, and this may be specified by the operator and computer controlled. Therefore, the computer may be programmed to adjust the airflow to suit the particular settings of the forest and achieve the desired pickup fraction. The volume of the air through the input chute 200 may be regulated by the computer controlled valves 204 and 205.

In certain embodiments, the cyclone separator 202 may include a top end and a bottom end. The intake chute 200 may feed into the top of the cyclone separator 202. A first conveyor drying column 213 may include a top end and a bottom end. The bottom end of the cyclone separator 202 may feed into the bottom end of the first conveyor drying column 213. The mixing column 207 may have a top end and a bottom end. The top end of the first conveyor drying column 213 may feed into the top end of the mixing column 207. The second conveyor drying column 214 may have top end and a bottom end. The bottom end of the mixing column 207 may feed into the bottom end of the second conveyor drying column 214. The top end of the second conveyor drying column 214 may feed into the rotating chute 212 which may feed into the pyrolyzer system 209. The first and second conveyor drying column 213, 214 may include a continuous chain that may include a plurality of wire baskets attached.

The wood chips may flow from the input chute 200 into the cyclone separator 202. The cyclone separator 202 may include a conical body which may create an air cyclone. This is due to the air entering the cyclone separator 202 tangentially from the top from the blower 203 and drawn in a spiral down to the bottom. The chips, which are much denser than the air, may be thrown by centrifugal force against the outer wall and thus separated from the air. The air which is free of chips may then be used to cool the various heat exchangers 304, 305, 306 shown in FIG. 3. The wood chips may fall to the first conveyor drying column 213 in the first dryer duct 206. In certain embodiments, the first conveyor drying column 213 may include the series of baskets which may rise through the first dryer duct 206 containing hot and dry air. In certain embodiments, charcoal particles may be added to the wood chips to aid in coupling the dry wood chips to microwave energy in the later stages of the process of drying and pyrolysis. The wood chips and charcoal may be mixed and clumps may be broken up. The mixture of wood chips and charcoal may be dumped from the first conveyor drying column 213 into the mixing column 207. The wood and charcoal may be dried even further as it is lifted in the second dryer duct 208 on the second conveyor drying column 214 which may also include a series of baskets. The chips and charcoal mix may then be dumped through a loading bin 210 and through a rotating chute 212 into the pyrolyzer system 209 and the unloading bin 211.

In certain embodiments, the wood chips may go directly from the intake chute 200 to the pyrolyzer system 209 with much less drying. In such embodiments, the pyrolyzer system 209 may remove the moisture from the wood chips. Waste heat may be used to remove water from bio oil.

As mentioned above, the loading bin 210 may feed the rotating shoot 212, which may direct the mixture of chips and carbon to the pipelined batch pyrolyzer 209. The pyrolyzer 209 may include multiple chambers 500, in which the rotating shoot 212 may direct the chips into each chamber 500. As illustrated in FIG. 4, the pyrolyzer 209 may include six flasks 401 through 406 within the chambers 500. Therefore, six batches of wood may be processed. However, different numbers of chambers and flasks creating different numbers of batches may be utilized. The present invention may provide flexibility for the computer to optimize microwave power, pressure/vacuum, heating times, and temperatures in four separate stages of the pipeline. The cycle time of the pyrolyzer 209 may also be varied. The varied cycle time may be useful because the input may constantly be changing depending on the type of biomass and moisture content. Further, the desired proportion of bio char, bio oil, and biogas may vary, due to market demands. The operator may input in the computer the several predefined categories of wood that may be chipped. In certain embodiments, the operator may input in the computer a desired final product from a remote location.

FIG. 4 illustrates the pipelined batch pyrolyzer 209 from above. Flasks 401, 402, 403, 404, 405, 406 may be made of a borosilicate glass tube with removable gas tight ends, which may be heated with commercially available microwave heating components 407, 408, 409, 410. The filling and emptying of each flask 401-406 and the heat modes may move from position to position. The microwave heaters 407-410 may be available in all six positions, however, in certain embodiments, four may be used at a time.

Figure 5:
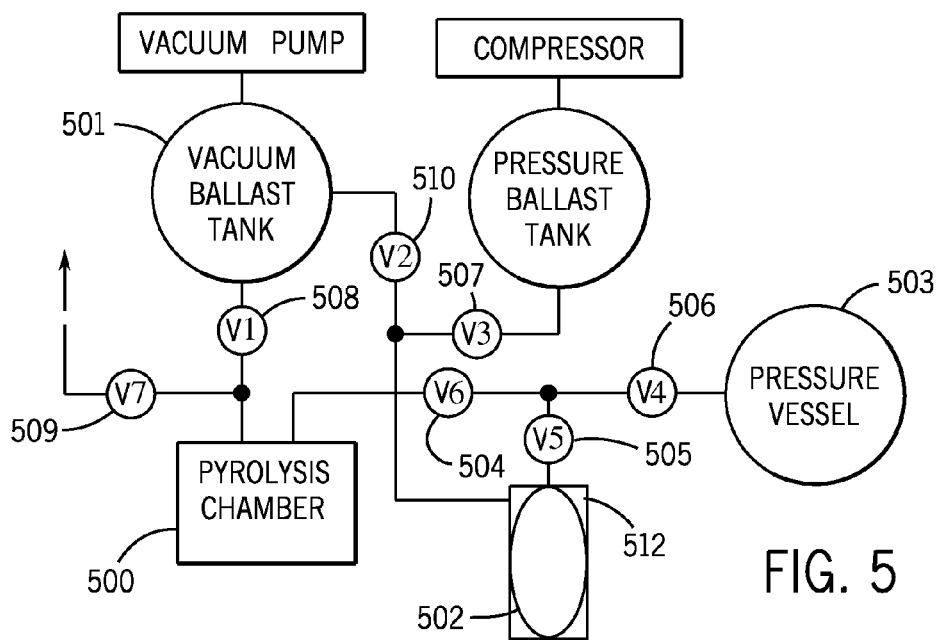
FIG. 5 is a block diagram of the main components of one module of the drying pyrolyzer.

The pyrolysis gas/vapor management system for a single flask is illustrated in FIG. 5. The gas and vapor handling apparatus may be connected to each flask 401-406 by flexible tubes and may be available in the six positions. During the filling of the flasks, the gas tight top may be removed and in the emptying mode, both the top and bottom may be removed and in certain embodiments, a plunger may pass through the flask to assure clearance.

As illustrated in FIG. 5, a pair of pumps may be running constantly to maintain pressure and vacuum in two ballast tanks. This may allow the rapid evacuation or pressurization of any system components by opening and closing valves 504, 505, 506, 507, 508, 509, 510. The six pyrolysis chambers 500 may be connected to the vacuum ballast tank 501. Each chamber 500 may be connected to a flexible bag 502 in which bio oil may be collected. The bags 502 may be surrounded by containers 512. The chambers 500 and bags 502 are connected to the pressure vessel 503 in which biogas may be collected The liquid products produced by the pyrolysis of wood contain various complex resins used in making varnish and may coat the interior of pumps and valves. To prevent malfunction of the machine 10 due to the coatings, elements may be routinely replaced. The flexible plastic or rubber bag 502 may be connected to the pyrolysis chamber 500 by a T-shaped flexible tube on which three pinch valves 504, 505, 506 are mounted. The pressure within the bag 502 may be cycled by cycling the pressure within the container 512, which may surround the bag 502 and may be connected to both the vacuum 501 and pressure ballast tanks. Thus the flexible bag 502 may be used as a routinely replaced pump to pull products from the pyrolysis chamber 500, collect and hold the bio oil, and pass the biogas on to the pressure vessel 503.

The flasks of the present invention may be used in different modes. First flask 401 may be filled with a biomass/carbon mixture and sealed. For the second flask 402, a rough vacuum may be pulled, by closing valve six 504 and opening valve one 508 while the wood may be heated to a temperature high enough to drive off water, but below the ignition temperature of wood, using the microwave heater 407. During this mode, air and moisture may be pulled from the chamber 500 into the vacuum ballast tank 501 and exhausted to the atmosphere through the vacuum pump. At the end of this mode, the valve one 508 may be closed. For flask 403, valve six 504 and valve one 508 may be initially closed. Microwave heater 408 may be applied to heat the biomass to pyrolysis temperature. The pressure in the chamber, which starts out at a rough vacuum, rises until it is above 1 atm. At this point valve six 504 and valve five 505 may be opened and the flexible bag 502 may fill with a mixture of biogas and bio oil. The space between the bag 502 and the container 512 may be filled with circulating cold water which condenses the bio oil. Condensation is further enhanced by closing valve six 504 and opening valve four 506 which raises the pressure in the bag 502 to the pressure in the pressure vessel 503. At this point the pressure in the container 512 may be raised to force the biogas into the pressure vessel 503. When the gas has been expelled, which may be determined by sensing the liquid level in the bag 502, valve four 506 may be closed, the pressure dropped and valve six 504 opened. This cycle is repeated, using the valve three 507 and valve two 510 to pump the biogas and bio oil out of the pyrolysis chamber 500, condense the bio oil vapor, and pass the biogas to the pressure vessel 503. This process may occur in the third and forth flasks 403 and 404. At the end of mode of the fourth flask 404 the biomass may be completely pyrolyzed and a rough vacuum may be pulled to extract as much product as possible. Valve six 504 may then be closed. For the fifth flask 405, the hot bio char which is all that may remain in the pyrolysis chamber 500 may be cooled with a brief spray of water to prevent catching on fire when exposed to air. Then the chamber 500 may be vented to air by opening the vent valve seven 509. For the sixth flask 406, the contents of the pyrolysis chamber 500 may be ejected into the bin 211.

The bio char may be deposited from the carbon outlet 201. The bio char may be deposited on the ground just in front of the wheels 102, 106. The bags 502 may collect the bio oil, as mentioned above. The full bags 502 of bio oil may be deposited behind the machine 10 for later pickup. The bags 502 may be deposited from the rear of the machine 10 on chute 105 as illustrated in FIG. 1. The biogas may be used to fuel the machine 10 and potentially other equipment in the field.

Figure 3:
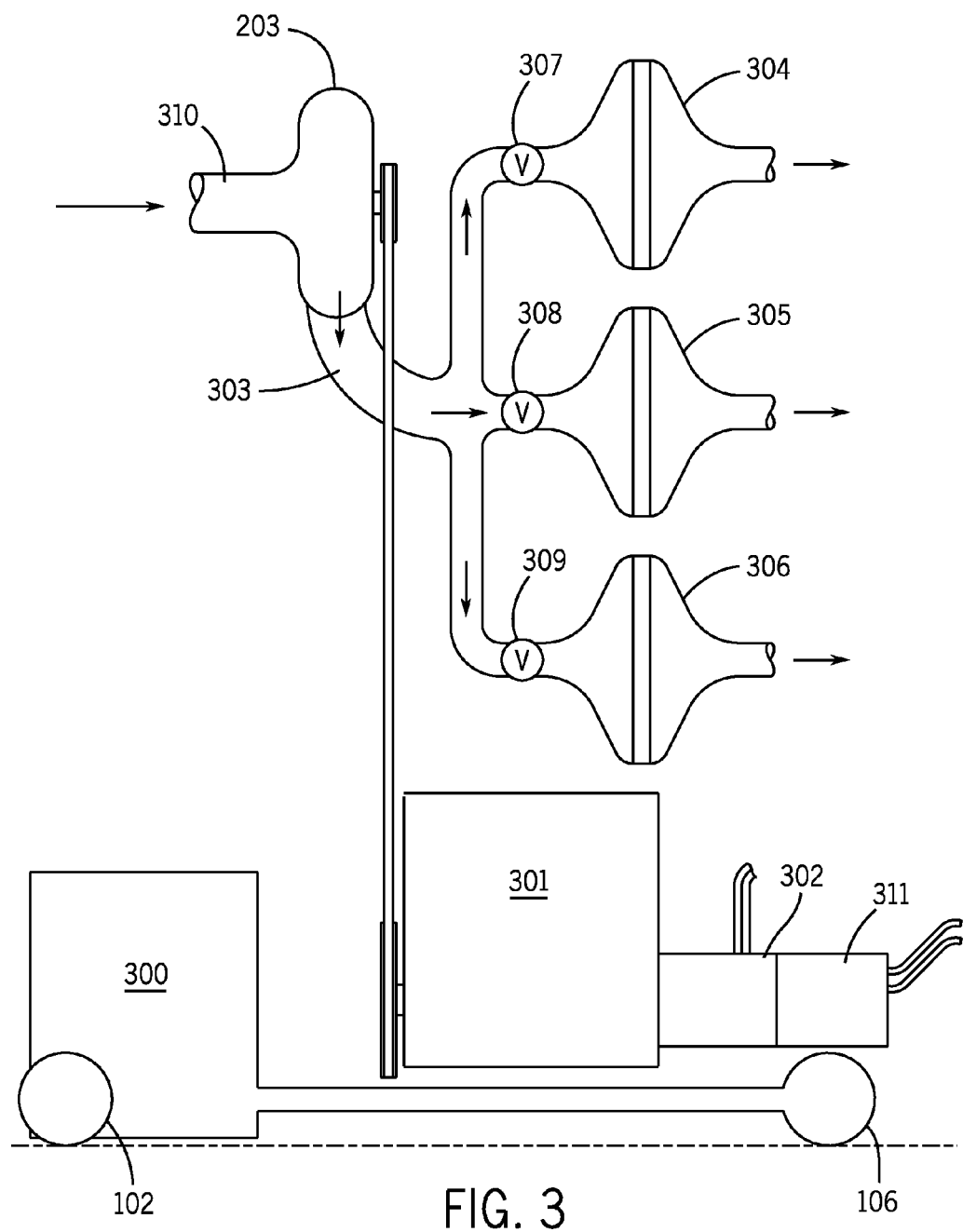
FIG. 3 is a schematic view of the power system and waste heat scavenging system.

As illustrate in FIG. 3, the machine 10 of the present invention may be powered by an engine and power train 300. In certain embodiments, the present invention may include two front wheels 103 and two rear wheels 106 and may be a four wheel drive vehicle. The final drive of each wheel may be geared down to provide high torque at low speeds as needed. In alternative embodiments, the wheels 102, 106 may be driven by hydraulic or electric motors. In such embodiments the engine and power train 300 may be an internal combustion engine driving a hydraulic pump or electric generator with a control system and suspension.

The present invention may further include a wood processing internal combustion engine 301 that may be operatively connected to an electric generator 302, a hydraulic pump 311, and the blower 203. The intake port 310 of the blower 203 may be attached to the cyclone separator 202. The exhaust port 303 of the blower 203 may feed air to multiple heat exchangers, which may include a first heat exchanger 304, a second heat exchanger 305, and a third heat exchanger 306. The hot air from the heat exchangers 304-306 may be fed to the drying system, such as the first dryer duct 206, the mixing column 207, and second dryer duct 208. The airflow may be maintained by the computer using the computer controlled first valve 307 for the first heat exchanger 305, the second valve 308 for the second heat exchanger 305, and the third valve 309 for the third heat exchanger 306. The electric generator 302 may supply power to the system's electric motors and electronics.

It should be understood, of course, that the foregoing relates to exemplary embodiments of the invention and that modifications may be made without departing from the spirit and scope of the invention as set forth in the following claims.

What is claimed is:

1. A brush clearing and conversion machine comprising:
a body having a front end and a rear end;
at least one front wheel mounted to the machine near the front end and at least one rear wheel mounted to the machine near the rear end;
a wood chipper;
a wood processing component comprising an intake chute, a blower operatively connected to the intake chute, creating a vacuum, and a pyrolyzer system, wherein the intake chute feeds into the pyrolyzer system; and
at least one motor having a power source, wherein the at least one motor is operatively connected to the chipper, the wood processing component, and at least one of the front wheel and rear wheel,
wherein the pyrolyzer system is capable of converting wood chips into bio fuel.

2. The machine of claim 1, further comprising spikes protruding from at least one of the at least one front wheel and the at least one rear wheel.

3. The machine of claim 1, further comprising an active bar protruding from the front end of the body.

4. The machine of claim 1, further comprising a housing comprising a burner protruding from the rear end of the body and a water nozzle attached to the housing and oriented to spray fire created by the burner.

5. The machine of claim 1, wherein the wood processing component further comprises:
a cyclone separator having a top end and a bottom end, wherein the intake chute feeds into the top of the cyclone separator;
a first conveyor drying column having a top end and a bottom end, wherein the bottom end of the cyclone separator feeds into the bottom end of the first drying column;
a mixing column having a top end and a bottom end, wherein the top end of the first conveyor drying column feeds into the top end of the mixing column;
a second conveyor drying column having a top end and a bottom end, wherein the bottom end of the mixing column feeds into the bottom end of the second conveyor drying column;
a chute directed towards the pyrolyzer system, wherein the top end of the second drying column feeds into the chute; and
at least one heat exchanger connected to the blower by a blower output port, wherein the at least one heat exchanger directs hot air into the wood processing component.

6. The machine of claim 5, further comprising a computer system connected to at least one of the chipper and the wood processing component, wherein the computer system is configured to receive inputs to operate at least one of the chipper and the wood processing component.

7. The machine of claim 6, wherein at least one of the blower and the input chute is controlled by computer controlled valves.

8. The machine of claim 1, wherein the pyrolyzer system comprises:
   at least one pyrolysis chamber comprising at least one flask;
   a vacuum ballast connected to a vacuum pump and the pyrolysis chamber, wherein a first valve is in between the vacuum ballast and the pyrolysis chamber;
   a chamber containing a bag connected to the vacuum ballast, wherein a second valve is in between this chamber and the vacuum ballast;
   a pressure ballast tank connected to a compressor, and the chamber containing the bag, wherein a third valve is in between the pressure ballast tank and the chamber;
   a pressure vessel connected to the bag and the pyrolysis chamber, wherein a fourth valve and a fifth valve are in between the pressure vessel and the bag, and wherein the fourth valve and a sixth valve are in between the pressure vessel and the pyrolysis chamber; and
   at least one microwave heater providing heat to the at least one flask.

9. The machine of claim 8, wherein the bio fuel is at least one of bio char, bio oil, and bio gas.

10. The machine of claim 9, further comprising a bin attached to the pyrolyzer system, wherein the pyrolyzer feeds into the bin.

11. The machine of claim 10, further comprising a carbon outlet attached to the bin, wherein the bin feeds into the carbon outlet.

12. The machine of claim 11, wherein the bio char is deposited from the carbon outlet to the outside of the vehicle.

13. The machine of claim 9, wherein the biogas is stored in the pressure vessel.

14. The machine of claim 9, wherein the bio oil is stored in the bags.

15. The machine of claim 14, further comprising a chute attached to the rear of the end of the body, wherein the bags with bio oil are deposited on the chute and exit the machine.

16. The machine of claim 13, wherein the stored biogas is used as the power source of the machine.

17. The machine of claim 1, wherein the wood processing component further comprises:
   a cyclone separator having a top end and a bottom end, wherein the intake chute feeds into the top of the cyclone separator;
   a drying column having a top end and a bottom end wherein the bottom end of the cyclone separator feeds into the bottom end of the drying column;
   a chute directed toward the pyrolyzer system, wherein the top end of the drying column feeds into the chute; and
   at least one heat exchanger connected to the blower by a blower output port, wherein at least one heat exchanger directs hot air into the wood processing component.

* * * * *